United States Patent [19]

Morisawa

[11] Patent Number: 5,077,572
[45] Date of Patent: Dec. 31, 1991

[54] HOUSING STRUCTURE FOR BACKUP BATTERY

[75] Inventor: Tahei Morisawa, Tokyo, Japan

[73] Assignee: Asahi Kogaku Kogyo Kabushiki Kaisha, Tokyo, Japan

[21] Appl. No.: 547,209

[22] Filed: Jul. 3, 1990

[30] Foreign Application Priority Data

Jul. 11, 1989 [JP] Japan ............................ 1-81464[U]

[51] Int. Cl.$^5$ .............................................. G03B 7/26
[52] U.S. Cl. .................................. 354/484; 206/333; 429/96
[58] Field of Search .................. 354/484, 288, 354; 206/333, 335; 429/96, 97

[56] References Cited

U.S. PATENT DOCUMENTS

| 4,031,295 | 6/1977 | Rigazio | 354/96 |
| 4,668,070 | 5/1987 | Wakabayashi et al. | 354/484 |
| 4,697,909 | 10/1987 | Machida et al. | 354/484 |
| 4,718,742 | 1/1988 | Utoh et al. | 354/96 |
| 4,925,025 | 5/1990 | Antem et al. | 206/335 |

FOREIGN PATENT DOCUMENTS 8811902  2/1989  Fed. Rep. of Germany .
 631702 11/1949  United Kingdom .

Primary Examiner—Michael L. Gellner
Assistant Examiner—Cassandra C. Spyrou
Attorney, Agent, or Firm—Sandler, Greenblum & Bernstein

[57] ABSTRACT

A housing structure is formed in a camera body to house a backup battery. The housing structure includes a backup battery chamber that is connected to a main chamber in which a main battery is housed. An inlet to the backup battery chamber is formed in one wall of a plurality of walls that define the main chamber.

8 Claims, 2 Drawing Sheets

HOUSING STRUCTURE FOR BACKUP BATTERY

BACKGROUND OF THE INVENTION

1. Field of the Invention

The present invention relates to a housing structure for housing a small object, such as a backup battery, for a computer memory installed in a camera.

2. Description of the Related Art

Conventionally, a camera having a computer is provided with a backup battery to ensure that data memorized stored in a memory is always maintained, even if a voltage drop occurs at a main battery. The main battery has a large capacity that is needed to operate a camera and, for example, comprises a rectangular parallelepiped Ni-Cd battery. A chamber for housing the main battery is open and closed by a cover provided on an under surface, for example, of the camera. The backup battery comprises, for example, a lithium battery which is much smaller than the main battery, and is housed in an exclusive chamber formed in a part of the camera body. The chamber for housing the backup battery is provided separately from the chamber for housing the main battery, and therefore, the covers of these chambers are formed as separate members.

As mentioned above, the backup battery is smaller than the main battery. Thus, the cover of the backup battery chamber is also smaller. Accordingly, in a conventional camera, when the cover for the backup battery is removed, it is often easily lost.

SUMMARY OF THE INVENTION

Therefore, an object of the present invention is to provide a housing structure whereby a backup battery is housed in a camera body without the need for a cover, to thus eliminate the problem of losing the cover of the backup battery chamber.

According to the present invention, there is provided a housing structure that includes a backup battery chamber connected to a main chamber in which a main battery is housed, the backup battery chamber having an inlet facing the main chamber.

Further, according to the present invention, there is provided a housing device that includes a sub-chamber, in which a backup battery is housed, the sub-chamber being provided adjacent to a main chamber in which a main battery is housed and having an inlet facing the main chamber, so that the sub-chamber and the main chamber communicate with each other.

Still further, according to the present invention, there is provided a housing structure for a main battery and a backup battery, the housing structure including a main chamber for housing the main battery and a sub-chamber for housing the backup battery, the main chamber and sub-chamber communicating with each other through an inlet formed on a wall defining the main chamber; this inlet being closed by the main battery when the main battery is housed in the main chamber.

Furthermore, according to the present invention, there is provided a housing structure for a large object and a small object, the housing structure including a main chamber for housing the large object and a sub-chamber for housing the small object, the main chamber and sub-chamber communicating with each other through an inlet formed on a wall defining the main chamber, the inlet being closed by the large object when the large object is housed in the main chamber.

BRIEF DESCRIPTION OF THE DRAWINGS

The present invention will be better understood from the description of a preferred embodiment of the invention set forth below, together with the accompanying drawings, in which.

DESCRIPTION OF THE PREFERRED EMBODIMENTS

Figure 1:
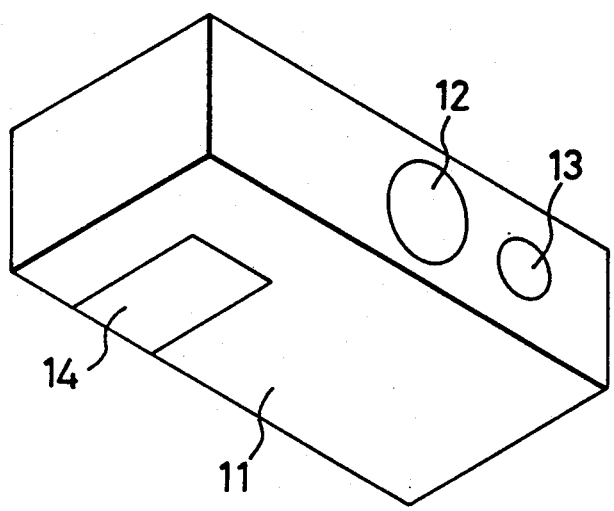
FIG. 1 is a perspective view of a camera having a housing structure of an embodiment of the present invention.

The present invention will now be described with reference to the embodiment shown in the drawings.

FIG. 1 is a view of a camera having a housing structure for a backup battery, seen from the bottom thereof; the housing structure being an embodiment of the present invention. As shown in this drawing, lens 12 and view finder 13 are provided on a front surface of camera body 11, and a battery cover 14 for a battery chamber, described below, is provided on an under surface of the camera body 11.

Figure 2:
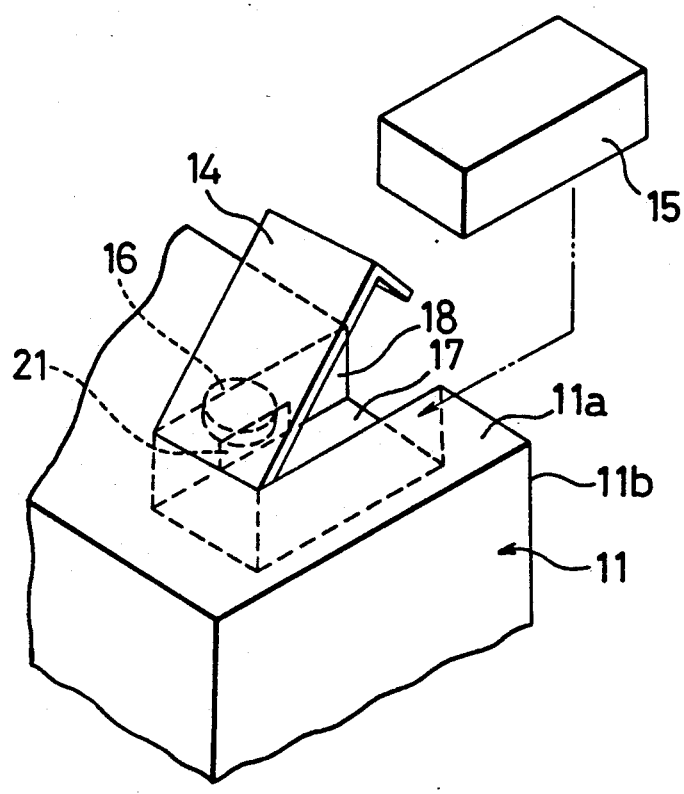
FIG. 2 is a perspective view of the embodiment of the present invention.

FIG. 2 is a view showing a disposition of a main battery 15 and a backup battery 16 in the camera body 11. The main battery 15 comprises, for example, a rectangular parallelepiped Ni-Cd battery. A main chamber 17, in which the main battery 15 is housed, is open at a bottom surface 11a and a back surface 11b of the camera body 11, and has a rectangular parallelepiped shape corresponding to the shape of the main battery 15. The battery cover 14 has an L-shaped section and covers the opening formed in the bottom surface 11a and the back surface 11b of the camera body 11, and is rotatably supported at the bottom surface 11a. A side wall 18 of the walls defining the main chamber 17 is provided with a battery inlet 21 through which the backup battery 16 is inserted into a backup battery chamber or sub-chamber 22 shown in FIGS. 3 and 4. Namely, the battery inlet 21 faces the main chamber 17 so that the main chamber 17 and the sub-chamber 22 communicate with each other through the inlet 21.

The backup battery 16 is, for example, a lithium battery, having a disk shape, and comprises much smaller than the main battery 15. Therefore, the sub-chamber 22 is much smaller than the main chamber 17, and the height of the battery inlet 21 is a fraction of the height of the side wall 18 of the main chamber 17.

Figure 3:
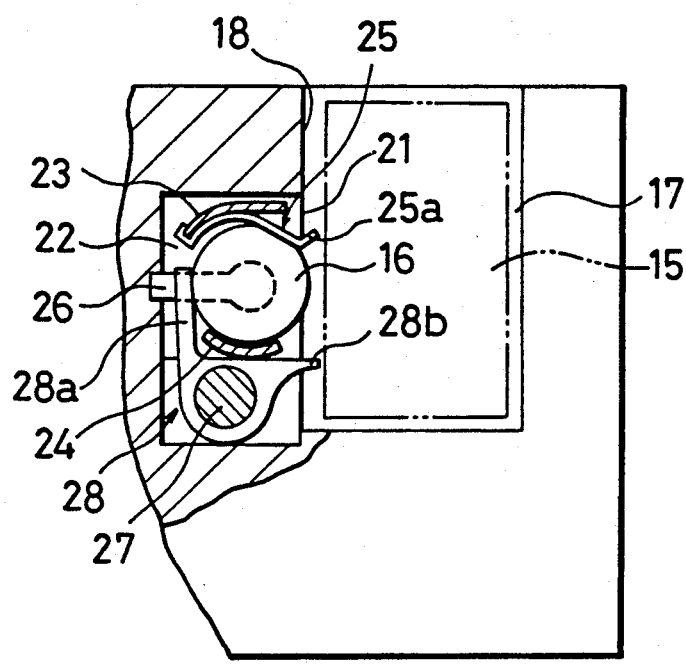
FIG. 3 is a partial sectional view showing a sub-chamber in which a backup battery is housed.
Figure 4:
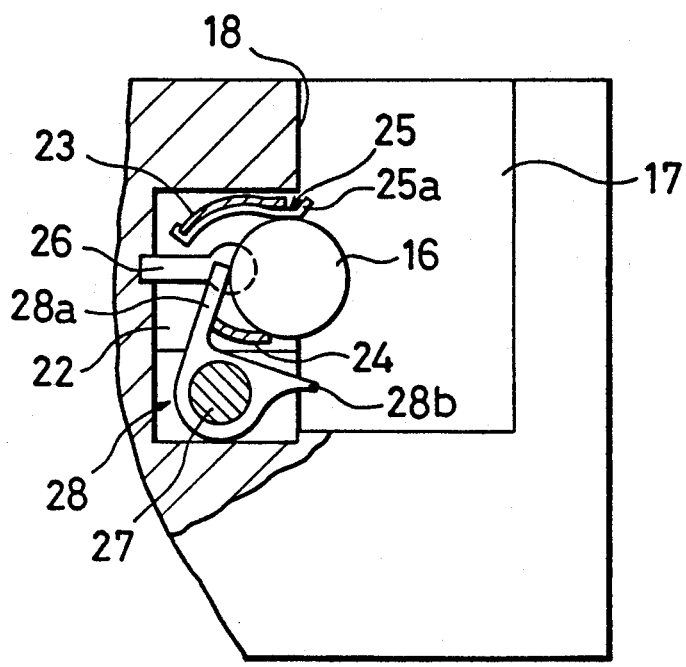
FIG. 4 is a partial sectional view showing the sub-chamber when the backup battery is ejected therefrom.

FIGS. 3 and 4 show a construction of the sub-chamber 22, which is provided adjacent to the main chamber 17, and is provided with two support walls 23 and 24 therein and facing an outer surface of the backup battery 16. Support wall 23 is provided with an electric pole member 25 formed of an elastic metal strip that engages a positive pole formed on an outer surface of the backup battery 16. A base portion of the electric pole member 25 is connected to an end of the support wall 23, and a tip portion 25a thereof engages an outer surface of the backup battery 16. Although the electric pole member 25 is formed in an arc as a whole, along the outer surface of the backup battery 16, the tip portion 25a is bent at an angle toward the outside of the electric pole member 25. Note that an electric pole member 26, which engages a negative pole of a backup battery 16, is located at the central portion of the sub-chamber 22.

An ejecting lever 28 is provided adjacent to the sub-chamber 22, which as rotatably supported by a pin 27 fixed to the camera body 11. The ejecting lever 28 has an ejecting arm 28a projecting into the central portion of the sub-chamber 22, and an operating arm 28b that projects into the main chamber 17. The ejecting arm 28a is engagable with an outer surface of the backup battery 22.

When the backup battery 16 is inserted into the sub-chamber 22 through the battery inlet 21, the tip portion 25a of the electric pole member 25 is pressed outward so that a space between the electric pole member 25 and the support wall 24 expands. As a result, the backup battery 16 is sandwiched and supported by the electric pole member 25 and the support wall 24, as shown in FIG. 3, and prevented from moving into the main chamber 17 by the tip portion 25a of the electric pole member 25. The main battery 15 is then inserted into the main chamber 17. Thus, the battery inlet 21 is closed when the main battery 15 is housed in the main chamber 17.

Conversely, when the backup battery 16 is to be ejected from the sub-chamber 22, the main battery 15 is first removed from the main chamber 17. Then the operating arm 28b is pressed so that the ejecting lever 28 is rotated clockwise. The rotation of the ejecting lever 28 causes the backup battery 16 to be pushed out into the main chamber 17 by the ejecting arm 28a, as shown in FIG. 4, against a spring force of the electric pole member 25.

As described above, the embodiment is constructed in such a manner that the sub-chamber 22 is connected to the main chamber 17, and the battery inlet 21 of the sub-chamber 22 is formed on the side wall 18 of the main chamber 17. Therefore, a small cover need not be provided for closing only the sub-chamber 22, as in a conventional construction. The backup battery 16 is supported by the electric pole member 25, and the battery inlet 21 of the sub-chamber 22 is closed by the main battery 15. Accordingly, the cover for the backup battery 16 cannot be lost, since it is not provided and the backup battery 16 is always firmly held in the camera body 11.

Note that, instead of using the electric pole member 25 to hold the backup battery 16 in the sub-chamber 22, the backup battery 16 may be prevented from dropping out of the sub-chamber 22 only by closing the battery inlet 21 by the main battery 15.

Further, the present invention is not restricted to a construction for housing a backup battery in a camera, but can be applied to a construction in which a small object and a large object are housed in a body.

Although the embodiments of the present invention have been described herein with reference to the accompanying drawings, obviously, many modifications and changes may be made by those skilled in this art without departing from the scope of the invention.

I claim:

1. A housing structure formed in a camera body to house to a backup battery, said housing structure comprising:
    a backup battery chamber connected to a main chamber in which a main battery is housed, said backup battery chamber having an inlet that faces said main chamber; and
    an ejecting lever that is rotatably supported by said camera body, said ejecting lever having an ejecting arm projecting into said backup battery chamber and an operating arm projecting into said main chamber, said ejecting arm engaging said backup battery to eject said backup battery from said backup battery chamber.

2. The housing structure according to claim 1, wherein said inlet is formed in one wall of a plurality of walls that define said main chamber.

3. The housing structure according to claim 1, wherein said backup battery chamber is smaller than said main chamber.

4. A device for housing a backup battery, said housing device comprising:
    means for defining a main chamber in which a main battery is housed;
    means for defining a sub-chamber in which said backup battery is housed, said sub-chamber being provided adjacent to said main chamber and having an inlet facing said main chamber so that said sub-chamber and said main chamber communicate with each other; and
    a rotatable ejecting lever that is provided adjacent to said sub-chamber, said ejecting lever having an ejecting arm that projects into said sub-chamber and an operating arm that projects into said main chamber, said ejecting arm engaging said backup battery to eject said backup battery from said sub-chamber.

5. The housing device according to claim 4, wherein said inlet is formed in one of a plurality of walls that define said main chamber.

6. The housing device according to claim 4, wherein said sub-chamber is smaller than said main chamber.

7. A housing structure for housing a main battery and a backup battery, said housing structure comprising:
    means for defining a main chamber for housing said main battery;
    means for defining a sub-chamber for housing said backup battery, said sub-chamber defining means having an inlet formed in one of a plurality of walls enclosing said main chamber, said main chamber and said sub-chamber communicating with each other through said inlet, said inlet being closed by said main battery when said main battery is housed in said main chamber; and
    a rotatable ejecting lever that is provided adjacent to said sub-chamber, said ejecting lever having an ejecting arm that projects into said sub-chamber and an operating arm that projects into said main chamber, said ejecting arm engaging said backup battery to eject said backup battery from said sub-chamber.

8. A housing structure for housing a large object and a small object, said housing structure comprising:
    a main chamber for housing said large object;
    a sub-chamber for housing said small object, wherein said main chamber and said sub-chamber communicate with each other through an inlet formed in one wall of a plurality of walls that define said main chamber, said inlet being closed by said large object when said large object is housed in said main chamber; and
    a rotatable ejecting lever provided adjacent to said sub-chamber, said ejecting lever having an ejecting arm that projects into said sub-chamber and an operating arm that projects into said main chamber, said ejecting arm engaging said small object to eject said small object from said sub-chamber.

* * * * *

UNITED STATES PATENT AND TRADEMARK OFFICE
CERTIFICATE OF CORRECTION

PATENT NO. : 5,077,572
DATED : December 31, 1991
INVENTOR(S) : T. MORISAWA

It is certified that error appears in the above-indentified patent and that said Letters Patent is hereby corrected as shown below:

At column 3, line 61 (claim 1, line 1) after "house" delete "to".

Signed and Sealed this

Tenth Day of October, 1995

Attest:

BRUCE LEHMAN

Attesting Officer

Commissioner of Patents and Trademarks